United States Patent
Wei et al.

(10) Patent No.: US 10,931,751 B2
(45) Date of Patent: Feb. 23, 2021

(54) METHOD AND SYSTEM FOR CLONING DATA USING A WEARABLE ELECTRONIC DEVICE

(71) Applicant: MOTOROLA SOLUTIONS, INC., Chicago, IL (US)

(72) Inventors: Baoxing Wei, Sichuan (CN); Haiqing Hu, Sichuan (CN); Wei Zeng, Sichuan (CN)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 23 days.

(21) Appl. No.: 16/078,783

(22) PCT Filed: Mar. 4, 2016

(86) PCT No.: PCT/CN2016/075650
§ 371 (c)(1),
(2) Date: Aug. 22, 2018

(87) PCT Pub. No.: WO2017/147906
PCT Pub. Date: Sep. 8, 2017

(65) Prior Publication Data
US 2019/0058763 A1    Feb. 21, 2019

(51) Int. Cl.
*H04L 29/08* (2006.01)
*G06F 1/16* (2006.01)
(Continued)

(52) U.S. Cl.
CPC .......... *H04L 67/1095* (2013.01); *G06F 1/163* (2013.01); *G06F 1/1698* (2013.01);
(Continued)

(58) Field of Classification Search
CPC .... H04L 67/1095; H04L 63/065; H04W 4/80; G06F 1/163; G06F 3/014; G06F 3/017; G06F 3/03
See application file for complete search history.

(56) References Cited

U.S. PATENT DOCUMENTS 9,088,552 B2    7/2015  Pinder
9,977,510 B1 *  5/2018  Moffett ................... G06F 3/017
(Continued)

FOREIGN PATENT DOCUMENTS

CN    104850769    8/2015
CN    105353870    2/2016
(Continued)

OTHER PUBLICATIONS

PCT/CN2016/075650 International Search Report and Written Opinion of the International Searching Authority dated Dec. 1, 2016 (11 pages).

*Primary Examiner* — Brian A Zimmerman
*Assistant Examiner* — Kevin Lau
(74) *Attorney, Agent, or Firm* — Michael Best and Friedrich LLP

(57) ABSTRACT

A system and method for cloning data using a wearable electronic device. The wearable electronic device includes a transceiver, a sensor, and an electronic processor electrically coupled to the transceiver and the sensor. The electronic processor is configured to establish, via the transceiver, a communications link with an electronic communications device. The electronic transceiver is further configured to transmit, via the transceiver to the electronic communications device, a device authentication key. The electronic processor is further configured to receive, from the sensor, at least one gesture signal. The electronic processor is further configure to, when the at least one gesture signal is received within a pre-determined period, determine at least one gesture from the at least one gesture signal. The electronic processor is further configured to determine a data cloning function based on the at least one gesture.

18 Claims, 2 Drawing Sheets

(51) Int. Cl.
*G06F 3/01* (2006.01)
*H04M 1/725* (2006.01)
*H04W 4/80* (2018.01)
*G06F 3/03* (2006.01)
*H04L 29/06* (2006.01)

(52) U.S. Cl.
CPC .............. *G06F 3/014* (2013.01); *G06F 3/017* (2013.01); *G06F 3/03* (2013.01); *H04L 63/065* (2013.01); *H04M 1/7253* (2013.01); *H04W 4/80* (2018.02); *H04M 1/72569* (2013.01)

(56) References Cited

U.S. PATENT DOCUMENTS

| | | | |
|---|---|---|---|
| 2006/0114822 A1* | 6/2006 | Savolainen | H04W 60/00 370/229 |
| 2014/0292636 A1 | 2/2014 | Rosener | |
| 2014/0070957 A1* | 3/2014 | Longinotti-Buitoni | A61B 5/6804 340/870.01 |
| 2017/0038847 A1* | 2/2017 | Schorsch | G06F 3/017 |
| 2017/0083102 A1* | 3/2017 | Dow | G06F 3/017 |
| 2017/0279612 A1* | 9/2017 | Liang | H04L 9/30 |

FOREIGN PATENT DOCUMENTS

| | | |
|---|---|---|
| WO | 2010096095 | 8/2010 |
| WO | 2015094220 | 6/2015 |

* cited by examiner

US 10,931,751 B2

METHOD AND SYSTEM FOR CLONING DATA USING A WEARABLE ELECTRONIC DEVICE

BACKGROUND OF THE INVENTION

Some portable two-way radios store configuration settings as a "codeplug" (or code plug). In a process known as "cloning," the codeplug of a particular portable two-way radio (that is, the source radio) may be stored into one or more portable two-way radios, which have hardware substantially similar to one another (that is, the target radios). Current cloning methods require specialized software running on a dedicated computer system, require the target radios to be in proximity to the computer system, or require the source radio and the target radio to be in proximity to one another.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
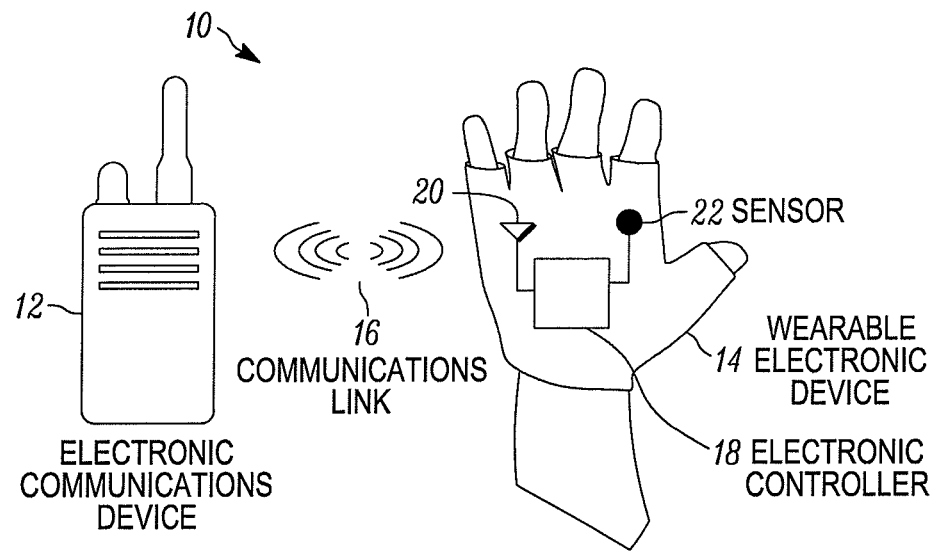
FIG. 1 is a block diagram of a data cloning system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One exemplary embodiment provides a system for cloning data. The system includes a wearable electronic device. The wearable electronic device includes a transceiver, a sensor, and an electronic processor electrically coupled to the transceiver and the sensor. The electronic processor is configured to establish, via the transceiver, a communications link with an electronic communications device. The electronic transceiver is further configured to transmit, via the transceiver to the electronic communications device, a device authentication key. The electronic processor is further configured to receive, from the sensor, at least one gesture signal. The electronic processor is further configure to, when the at least one gesture signal is received within a pre-determined period, determine at least one gesture from the at least one gesture signal. The electronic processor is further configured to determine a data cloning function based on the at least one gesture.

Another exemplary embodiment includes a method for operating a wearable electronic device that includes an electronic processor. The method includes establishing, via a transceiver electrically coupled to the electronic processor, a communications link with an electronic communications device. The method further includes transmitting, via the transceiver, to the electronic communications device, a device authentication key. The method further includes receiving, by the electronic processor from a sensor electrically coupled to the electronic processor, at least one gesture signal. The method further includes, when the at least one gesture signal is received within a pre-determined period, determining, by the electronic processor, at least one gesture from the at least one gesture signal. The method further includes determining, by the electronic processor, a data cloning function based on the at least one gesture.

Portable two-way radios and similar devices may operate according to various configuration settings including, for example, transmit and receive frequencies, power levels, trunking parameters, signaling methods, service parameters, and the like. The configuration data are stored in a memory of a two-way radio, and sometimes referred to collectively as the "codeplug" (or code plug). In a process known as "cloning," the codeplug of a particular portable two-way radio (that is, the source radio) may be stored into one or more portable two-way radios, which have hardware substantially similar to one another (that is, the target radios). For example, a public safety agency having several hundred portable radios may use cloning and a single codeplug to identically configure all of the portable radios. One current method of cloning portable radios requires specialized software running on a dedicated computer system, and requires the target radios to be in proximity to the computer system. Another current method requires the source radio and the target radio to be in proximity. Accordingly, using the systems and methods described herein, a source radio may be cloned without a dedicated computer system or the proximity of a target radio.

FIG. 1 is a block diagram of one exemplary embodiment of a data cloning system 10. The data cloning system 10 includes an electronic communications device 12 and a wearable electronic device 14. For ease of description, the data cloning system 10 illustrated in FIG. 1 includes a single electronic communications device 12 and wearable electronic device 14. Alternative embodiments one or more of each of the components, or may include other alternative components.

In the illustrated embodiment, the electronic communications device 12 is a portable two-way radio. In alternative embodiments, the electronic communications device 12 may be a mobile two-way radio, a two-way radio accessory, a cellular telephone, a smart telephone, or other electronic communications device that includes, or is capable of being coupled to, components to enable wireless communications. The electronic communications device 12 includes various digital and analog components, which for brevity are not described herein and which may be implemented in hardware, software, or a combination of both. In one example, the electronic communications device 12 communicates via one or more wireless communications networks, for example, a land mobile radio (LMR) network, cellular network, and the like (all not shown). The operating characteristics (for example, frequencies, talk groups, and the like) of the electronic communications device 12 may be configured by storing a preconfigured codeplug into the memory. In the illustrated embodiment, the electronic communications device 12 operates according to the Extended Command and Management Protocol (XCMP) to communicate with the wearable electronic device 14 via a communications link 16 using a short-range wireless communications modality (for example, Bluetooth™, near field communication (NFC), and the like). Alternative embodiments may operate according to other suitable communications protocols or modalities.

In the embodiment illustrated, the wearable electronic device 14 is a "smart glove." In alternative embodiments, the wearable electronic device 14 may be a smart watch, smart ring, or another wearable device. The wearable electronic device 14 includes an electronic controller 18, an antenna 20, and a sensor 22. The wearable electronic device 14 also includes a suitable power source (for example, a battery (not shown)). The power source may be internal or external to the wearable electronic device 14. For ease of description, the wearable electronic device 14 illustrated in FIG. 1 includes only one of each of the listed components. Alternative embodiments may include more or fewer of each of these components, may combine some components, or may include other alternative components. The components may be integrated within the wearable electronic device 14, or may be externally coupled and modular, for example, to enable the removal or addition of some of the components.

In some embodiments, the wearable electronic device 14 is constructed from suitable weather-resistant materials that also provide protection dust and moisture protection for the electrical components of the wearable electronic device 14. In some embodiments, the wearable electronic device 14 may have particular usefulness for public safety personnel (for example, police, firefighters, and emergency medical technicians). However, use of the wearable electronic device 14 or the data cloning system 10 is not limited to public safety applications.

Figure 2:
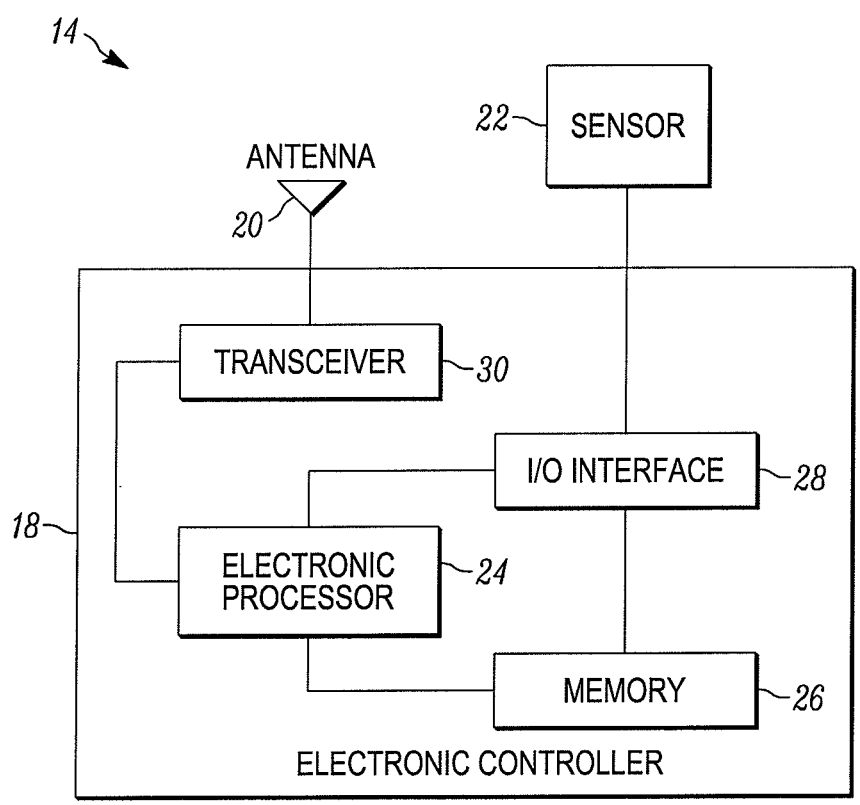
FIG. 2 is a block diagram of a wearable electronic device in accordance with some embodiments.

FIG. 2 is a block diagram of the wearable electronic device 14, according to one embodiment. The electronic controller 18 includes an electronic processor 24, a memory 26, an input/output interface 28, and a transceiver 30. The foregoing components of the electronic controller 18, along with the antenna 20, the sensor 22, and other various modules and components, are coupled to each other by or through one or more electrical connections, which may include, for example, control or data buses that enable communication therebetween. The use of control and data buses for the interconnection between and exchange of information among the various modules and components would be apparent to a person skilled in the art in view of the description provided herein. For ease of description, the electronic controller 18 illustrated in FIG. 2 includes only one of each of the listed components. Alternative embodiments may include more or fewer of each of these components, may combine some components, or may include other alternative components. In some embodiments, the wearable electronic device 14 may include other digital and analog components, which for brevity are not described herein and which may be implemented in hardware, software, or a combination of both, for controlling the components of the wearable electronic device 14.

The electronic processor 24 controls the other components of the wearable electronic device 14. The electronic processor 24 obtains and provides information (for example, from the memory 26 and/or the input/output interface 28), and processes the information by executing one or more software instructions or modules, capable of being stored, for example, in a random access memory ("RAM") area of the memory 26 (for example, during execution) or a read only memory ("ROM") of the memory 26 (for example, on a generally permanent basis) or another non-transitory computer readable medium. The software may include firmware, one or more applications, program data, filters, rules, one or more program modules, and other executable instructions. The electronic processor 24 retrieves from the memory 26 and executes, among other things, software related to the control processes and methods described herein.

The memory 26 may include one or more non-transitory computer-readable media, and includes a program storage area and a data storage area. The program storage area and the data storage area can include combinations of different types of memory, as described herein. In some embodiments, the electronic processor 24 reads and writes data (for example, one or more codeplugs) relating to the electronic communications device 12 from and to a data storage area of the memory 26.

The input/output interface 28 obtains information and signals from, and provides information and signals to, (for example, over one or more wired and/or wireless connections) devices both internal and external to the wearable electronic device 14. Output may be provided via output mechanisms such as, for example, haptic feedback motors and light sources (not shown). In one example, input may be provided via the sensor 22.

The electronic processor 24 controls the transceiver 30 to communicate with the electronic communications device 12 via the communications link 16 using a short-range wireless communications modality (for example, Bluetooth™, near field communication (NFC), and the like). The antenna 20 is conventional, and will not be described in greater detail. In one exemplary embodiment, the electronic processor 24 communicates with the electronic communications device 12 via the communications link 16 (for example, using the Extended Command and Management Protocol) to send and receive codeplug data to and from the electronic communications device 12 via the communications link 16.

The wearable electronic device 14 includes at least one sensor 22. In some embodiments, the sensor 22 is a transducer, which detects changes in a characteristic (for example, position, speed, pressure), and produces electrical signals (for example, an alternating current) that correspond to the detected changes. In some embodiments, the sensor 22 is a sensor package including one or more transducers. In some embodiments, the wearable electronic device 14 includes multiple sensors, sensor packages, or types of sensors. The sensor 22 may be, for example, an accelerometer, a gyroscope, a compass, a pressure sensor, or some combination of the foregoing. In one exemplary embodiment, the sensor 22 senses gestures. Gestures are particular sequences of movements made by a wearer of the wearable electronic device 14, and may include, for example, pressing (for example, against a surface), waving, moving in a circle, twisting, clapping, moving in a straight line, making or extending a fist, pointing, wriggling the fingers, and the like. As the wearable electronic device 14 is moved by its wearer to make at least one gesture, the sensor 22 generates at least one gesture signal representing the motions that make up the at least gesture, and communicates the at least one gesture signal to the electronic processor 24 via the input/output interface 28. In one exemplary embodiment, the sensor 22 is a finger motion sensor, positioned within the wearable electronic device 14 (for example, a smart glove) such that the sensor 22 can sense motions particular to one of the fingers of the wearer.

Figure 3:
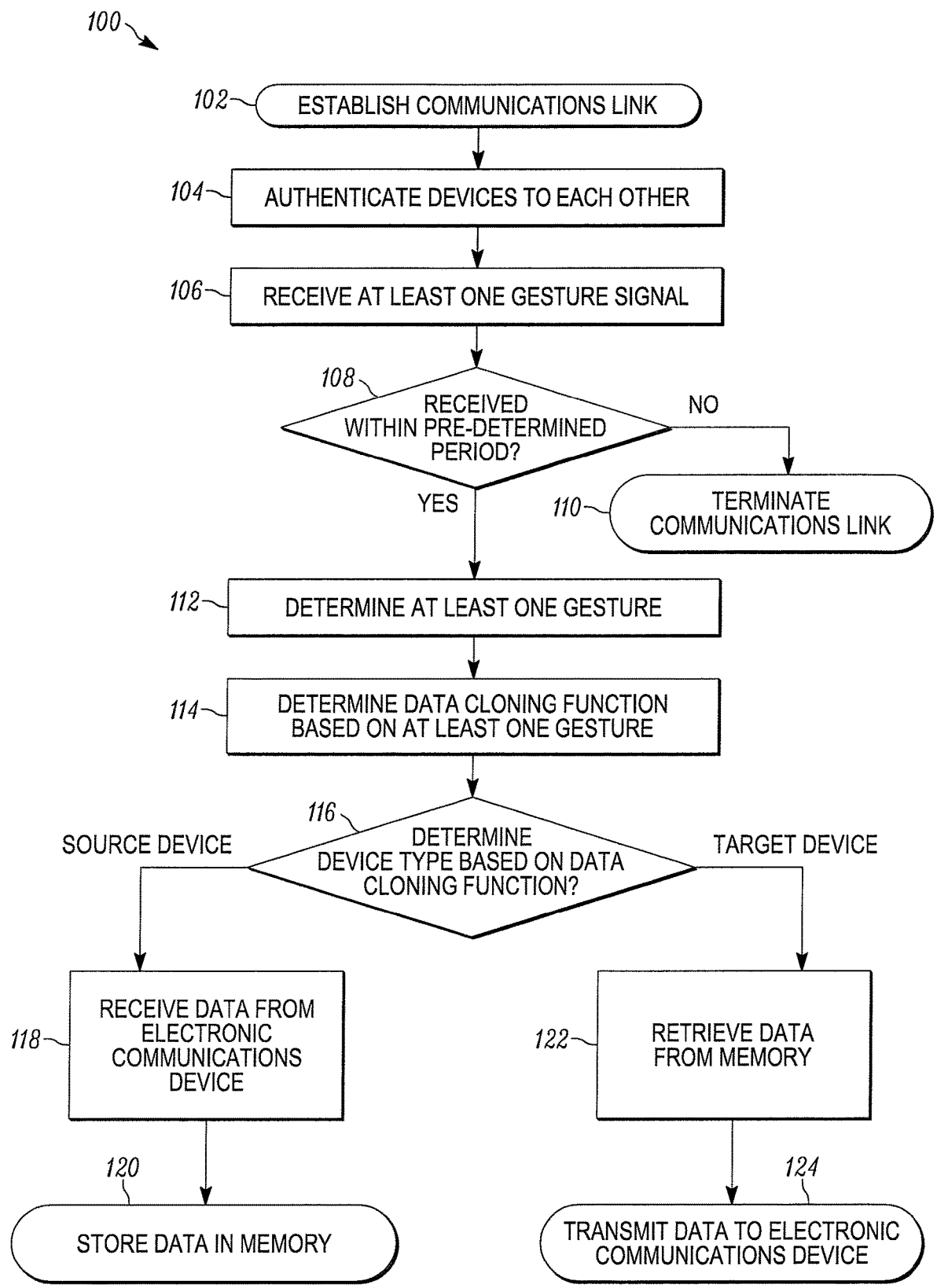
FIG. 3 is a flowchart of a method of controlling the wearable electronic device of FIG. 2 in accordance with some embodiments.

FIG. 3 is a flowchart of a method 100 for controlling the wearable electronic device 14, according to one embodiment. As an example, the method 100 is described herein in terms of using a smart glove (the wearable electronic device 14) to clone portable two-way radios by transferring codeplug data between one or more radios. This should not be considered limiting; the concepts embodied in the example described may be applied to transferring different types of data between different types of electronic communications devices. For example, in an alternative embodiment, the method 100 and the wearable electronic device 14 may be used to transfer configuration or other data between two or more smart telephones.

At block 102, the electronic processor 24 controls the transceiver 30 to establish the communications link 16 with the electronic communications device 12. In one exemplary embodiment, the communications link 16 is established using a Bluetooth™ protocol wireless connection. In some embodiments, the communications link 16 is established in response to a gesture, for example, waving the wearable electronic device 14 back and forth a specified number of times while it is in proximity to the electronic communications device 12. In another embodiment, the electronic processor 24 may establish the communications link 16 automatically whenever the wearable electronic device 14 and the electronic communications device 12 are in proximity to one another.

At block 104, the wearable electronic device 14 and the electronic communications device 12 are authenticated to each other. In one example, the electronic processor 24 controls the transceiver 30 to transmit a device authentication key, retrieved from the memory 26, to the electronic communications device 12 using, for example, the Extended Command and Management Protocol (XCMP) Network Layer (XNL). The device authentication key is used to authenticate and secure (for example, with a suitable encryption protocol) the communications between the wearable electronic device 14 and the electronic communications device 12. In some embodiments, the electronic processor 24 will provide a notification to a user of the wearable electronic device 14, via the input/output interface 28, that authentication was successful.

When the authentication key has been transmitted, the electronic processor 24 may receive commands from the user of the wearable electronic device 14 to initiate a data cloning function. Data cloning functions include receiving codeplug data from the electronic communications device 12 and transmitting codeplug data to the electronic communications device 12. In one exemplary embodiment, the commands are entered by the user by performing at least one gesture while wearing the wearable electronic device 14. When the wearable electronic device 14 is moved by its wearer to make the at least one gesture, the sensor 22 generates at least one gesture signal representing the motions that make up the at least one gesture. The sensor 22 communicates the at least one gesture signal to the electronic processor 24 via the input/output interface 28. At block 106, the electronic processor 24 receives at least one gesture signal from the sensor 22 via the input/output interface 28.

At block 108, the electronic processor 24 determines whether the at least one gesture signal was received within a pre-determined time period from transmitting the authentication key at block 104. At block 110, when the at least one gesture signal is not received within the pre-determined period (for example, ten seconds), the electronic processor 24 terminates the communications link 16 to reduce the likelihood that erroneous gestures or commands may be received and executed by the electronic processor 24.

At block 112, when the at least one gesture signal is received within the pre-determined period, the electronic processor 24 determines, from the at least one gesture signal, the at least one gesture that produced the at least one gesture signal. The at least one gesture may be a single gesture, or it may be a sequence of gestures. Accordingly, the at least one gesture signal may be a single gesture from the sensor 22 representing a single gesture, or the at least one gesture signal may be multiple signals, received from one or more sensors, representing multiple gestures. For example, the electronic processor 24 may determine from the at least one gesture signal (for example, received from a pressure sensor) that the wearable electronic device 14 was pressed against a surface (for example, the electronic communications device 12). In another example, the electronic processor 24 may determine from the at least one gesture signal (for example, received from an accelerometer) that the wearable electronic device 14 was waved back and forth three times. In another example, the electronic processor 24 may determine from the at least one gesture signal (for example, received from a pressure sensor and an accelerometer) that the wearable electronic device 14 was pressed against a surface, waved back and forth three times, pressed against a surface again, and moved in a circular motion.

Embodiments of the wearable electronic device 14 may detect numerous unique gestures and numerous unique sequences of gestures. Some gestures, or sequences of gestures, may correspond to commands to execute functions (for example, data cloning functions). At block 114, the electronic processor 24, using data and instructions stored in the memory 26, determines a data cloning function based on the at least one gesture. In one example, a particular sequence of gestures (that is, at least one gesture) may correspond to copying the codeplug data from the electronic communications device 12, whereas a different sequence of gestures (that is, at least one gesture) may correspond to transmitting codeplug data to the electronic communications device 12. In some embodiments, a particular sequence of gestures (that is, at least one gesture) corresponds to a command to erase the codeplug data present in the memory 26.

At block 116, the electronic processor 24 determines a device type for the electronic communications device based on the data cloning function determined at block 114. For example, when the data cloning function is copying codeplug data from the electronic communications device 12, the electronic processor 24 determines that the electronic communications device 12 is a source device. In another example, when the data cloning function is transmitting codeplug data to the electronic communications device 12, the electronic processor 24 determines that the electronic communications device 12 is a target device.

At block 118, when the electronic communications device 12 is a source device, the electronic processor 24 requests and receives the codeplug data from the electronic communications device 12 via the communications link 16. In some embodiments, the codeplug data is encrypted by the electronic communications device 12 before it is transmitted to the wearable electronic device 14. At block 120, the electronic processor 24 stores the received codeplug data in the memory 26.

At block 122, when the electronic communications device 12 is a target device, the electronic processor 24 retrieves stored codeplug data from the memory 26. In some embodiments, the codeplug data is in the memory 26 because it has been received from a source device, according to blocks 118 through 120. In other embodiments, the codeplug data has been loaded into the memory 26 from another source. At block 124, the electronic processor 24 controls the transceiver 30 to transmit the codeplug data to the electronic communications device 12 via the communications link 16. In some embodiments, the electronic processor 24 verifies that the electronic communications device 12 is compatible with the codeplug data (for example, using the Extended Command and Management Protocol) before transmitting the codeplug data.

It should be understood that the method 100 may be repeated in whole or in part. For example, following transmission of the codeplug data to the electronic communications device 12, at block 124, the method 100 may return to block 102 to establish communication with another electronic communications device to transfer or transmit codeplug data to that device.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A system for cloning data, the system comprising:
   a wearable electronic device including
      a transceiver;
      a sensor; and
      an electronic processor electrically coupled to the transceiver and the sensor and configured to
         establish, via the transceiver, a communications link with an electronic communications device;
         transmit, via the transceiver to the electronic communications device, a device authentication key;
         receive, from the sensor, at least one gesture signal;
         when the at least one gesture signal is received within a pre-determined period from transmitting the device authentication key,
            determine at least one gesture from the at least one gesture signal; and
            determine a data cloning function based on the at least one gesture;

wherein the data cloning function is one selected from the group consisting of receiving codeplug data from the electronic communications device and transmitting codeplug data to the electronic communications device;
wherein the codeplug data includes at least one selected from the group consisting of transmit frequencies, receive frequencies, power levels, trunking parameters, signaling methods, and service parameters.

2. The system as claimed in claim 1, wherein the electronic processor is further configured to, when the at least one gesture signal is received outside of a pre-determined period, terminate the communications link with the electronic communications device.

3. The system as claimed in claim 1, wherein the wearable electronic device includes a memory, the electronic processor is electrically coupled to the memory, and the electronic processor is further configured to
determine whether the electronic communications device is a source device based on the data cloning function; and
when the electronic communications device is a source device,
receive, from the electronic communications device, data; and
store the data in the memory.

4. The system as claimed in claim 1, wherein the wearable electronic device includes a memory, and
the electronic processor is electrically coupled to the memory and is further configured to determine whether the electronic communications device is a target device based on the data cloning function; and
when the electronic communications device is a target device,
retrieve data from the memory; and
transmit the data to the electronic communications device.

5. The system as claimed in claim 1, wherein the wearable electronic device includes a memory, and
the electronic processor is electrically coupled to the memory, and is further configured to erase data from the memory based on the data cloning function.

6. The system as claimed in claim 1, wherein the sensor is one selected from a group consisting of an accelerometer, a gyroscope, a compass, and a pressure sensor.

7. The system as claimed in claim 1, wherein the wearable electronic device is one selected from a group consisting of a smart glove, a smart watch, and a smart ring.

8. The system as claimed in claim 1, wherein the electronic communications device is one selected from a group consisting of a portable two-way radio, a mobile two-way radio, a two-way radio accessory, and a smart telephone.

9. The system as claimed in claim 1, wherein the wearable electronic device is a smart glove and the sensor is at least one finger motion sensor integrated into the smart glove.

10. A method for controlling a wearable electronic device that includes an electronic processor, the method comprising:
establishing, via a transceiver electrically coupled to the electronic processor, a communications link with an electronic communications device;
transmitting, via the transceiver, to the electronic communications device, a device authentication key;
receiving, by the electronic processor from a sensor electrically coupled to the electronic processor, at least one gesture signal;
when the at least one gesture signal is received within a pre-determined period from transmitting the device authentication key,
determining, by the electronic processor, at least one gesture from the at least one gesture signal; and
determining, by the electronic processor, a data cloning function based on the at least one gesture;
wherein the data cloning function is one selected from the group consisting of receiving codeplug data from the electronic communications device and transmitting codeplug data to the electronic communications device;
wherein the codeplug data includes at least one selected from the group consisting of transmit frequencies, receive frequencies, power levels, trunking parameters, signaling methods, and service parameters.

11. The method as claimed in claim 10, further comprising:
when the at least one gesture signal is received outside of a pre-determined period, terminating, by the electronic processor, the communications link with the electronic communications device.

12. The method as claimed in claim 10, further comprising:
determining, by the electronic processor, whether the electronic communications device is a source device based on the data cloning function; and
when the electronic communications device is a source device,
receiving, via the transceiver from the electronic communications device, data; and
storing, by the electronic processor, the data in a memory electrically coupled to the electronic processor.

13. The method as claimed in claim 10, further comprising:
determining, by the electronic processor, whether the electronic communications device is a target device based on the data cloning function; and
when the electronic communications device is a target device,
retrieving, by the electronic processor, data from a memory electrically coupled to the electronic processor; and
transmitting, via the transceiver, the data to the electronic communications device.

14. The method as claimed in claim 10, further comprising:
erasing, by the electronic processor, data from a memory electrically coupled to the electronic processor based on the data cloning function.

15. The method as claimed in claim 10, wherein the sensor is one selected from a group consisting of an accelerometer, a gyroscope, a compass, and a pressure sensor.

16. The method as claimed in claim 10, wherein the wearable electronic device is one selected from a group consisting of a smart glove, a smart watch, and a smart ring.

17. The method as claimed in claim 10, wherein the electronic communications device is one selected from a group consisting of a portable two-way radio, a mobile two-way radio, a two-way radio accessory, and a smart telephone.

18. The method as claimed in claim 10, wherein the wearable electronic device is a smart glove; and
wherein receiving the at least one gesture signal includes receiving, by the electronic processor from at least one finger motion sensor, the at least one gesture signal; and wherein the at least one finger motion sensor is integrated into the smart glove.

* * * * *